(12) United States Patent
Huang

(10) Patent No.: US 8,890,597 B2
(45) Date of Patent: Nov. 18, 2014

(54) HEAT UTILIZING CIRCUIT, ELECTRONIC DEVICE, AND METHOD

(71) Applicant: Hon Hai Precision Industry Co., Ltd., New Taipei (TW)

(72) Inventor: Sen-Lung Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/062,907

(22) Filed: Oct. 25, 2013

(65) Prior Publication Data

US 2014/0159794 A1    Jun. 12, 2014

(30) Foreign Application Priority Data

Dec. 7, 2012  (TW) .............................. 101145999 A

(51) Int. Cl.
*H03L 5/00* (2006.01)
*H02M 11/00* (2006.01)

(52) U.S. Cl.
CPC .................................... *H02M 11/00* (2013.01)
USPC ................ 327/306; 327/26; 327/31; 327/172

(58) Field of Classification Search
USPC ............. 327/306–333; 361/56, 90, 91.1–91.8
See application file for complete search history.

(56) References Cited

U.S. PATENT DOCUMENTS

| | | | | |
|---|---|---|---|---|
| 3,733,519 A | * | 5/1973 | Griffey | 361/91.5 |
| 6,300,818 B1 | * | 10/2001 | Mao | 327/513 |
| 7,542,257 B2 | * | 6/2009 | McCormick et al. | 361/91.1 |
| 2007/0216458 A1 | * | 9/2007 | Chiu et al. | 327/175 |
| 2009/0256617 A1 | * | 10/2009 | Ochi | 327/333 |
| 2010/0188136 A1 | * | 7/2010 | Baker et al. | 327/512 |
| 2013/0147450 A1 | * | 6/2013 | Pan | 323/282 |

FOREIGN PATENT DOCUMENTS

| | | |
|---|---|---|
| CN | 102782979 | 11/2012 |
| TW | 201209274 | 3/2012 |

* cited by examiner

*Primary Examiner* — Brandon S Cole
(74) *Attorney, Agent, or Firm* — Novak Druce Connolly Bove + Quigg LLP

(57) ABSTRACT

A method for utilizing heat includes steps: converting heat to electrical power, and converting the electrical power to a PWM voltage signal to power a function module. Obtaining an input voltage of the function module and comparing the input voltage with a reference voltage. Increasing a duty cycle of the PWM voltage signal when comparing the input voltage is grater than the reference voltage. And decreasing a duty cycle of the PWM voltage signal when comparing the input voltage is less than the reference voltage.

14 Claims, 3 Drawing Sheets

HEAT UTILIZING CIRCUIT, ELECTRONIC DEVICE, AND METHOD

BACKGROUND

1. Technical Field

The present disclosure relates to circuits, and particular to a heat utilizing circuit, an electronic device, and a method.

2. Description of Related Art

Usually, when electronic devices, such as mobile phones, tablet computers are powered on and in a working state, heat is produced. The heat wastes power and easy damages the electronic devices. Nowadays, some heat recovery devices can utilize the heat produced by the electronic devices, however, the common heat recovery device is complex and expensive.

A heat utilizing circuit, an electronic device, and a method to overcome the described limitations are thus needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will be described with reference to the accompanying drawings.

Figure 1:
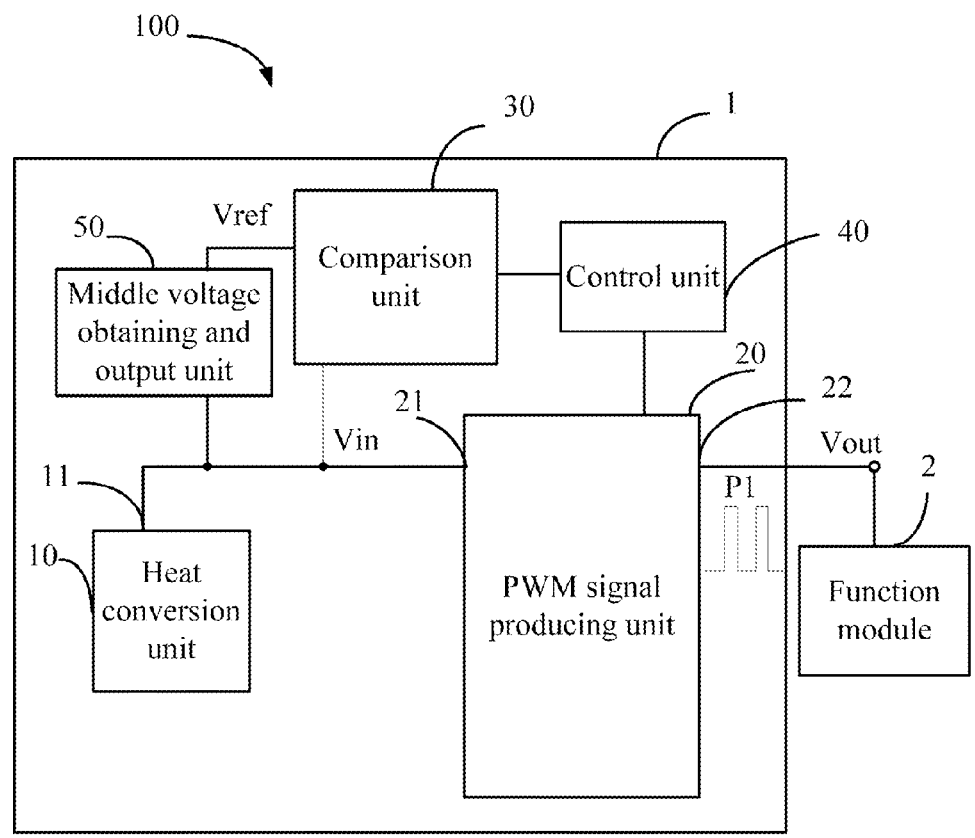
FIG. 1 is a block diagram of an embodiment of an electronic device with a heat utilizing circuit.

FIG. 1 illustrates a block diagram of an embodiment of an electronic device 100. The electronic device 100 includes a heat utilizing circuit 1 and a function module 2. The heat utilizing circuit 1 converts the heat radiated by the electronic device 100 to electrical power to power the function module 2. The function module 2 includes at lease one component, such as, a processer, a storage unit, or a codec, for example.

FIG. 1 shows that the heat utilizing circuit 1 includes a heat conversion unit 10, a pulse width modulation (PWM) signal producing unit 20, a comparison unit 30, and a control unit 40. The heat conversion unit 10 is used to convert the heat to electrical power. The PWM signal producing unit 20 includes a first port 21 and a second port 22. The first port 21 is electrically connected to the heat conversion unit 10, and the second port 22 is electrically connected to the function module 2. The PWM signal producing unit 20 converts the electrical power produced by the heat conversion unit 10 to a PWM voltage signal P1 and powers the function module 2 by using the PWM voltage signal P1. The heat conversion unit 10 and the function module 2 constitute an electricity network via the PWM producing unit 20, thus, a voltage of the first port 21 is can be considered as an input voltage Vin of the function module 2, and a voltage of the second port 22 can be considered as an output voltage Vout of the function module 2.

The comparison unit 30 is connected to the first port 21 of the PWM signal producing unit 20. The comparison unit 30 obtains the input voltage Vin of the function module 2 and compares the input voltage Vin with a reference voltage Vref.

The comparison unit 30 produces a first trigger signal when comparing the input voltage Vin is grater than the reference voltage Vref, and produces a second trigger signal when comparing the input voltage Vin is less than the reference voltage Vref.

The control unit 40 is connected to the comparison unit 30 and the PWM signal producing unit 20, and is used to increase a duty cycle of the PWM voltage signal P1 produced by the PWM signal producing unit 20 to cause the input voltage Vin to be decreased when receiving the first trigger signal. The control unit 40 is also used to decrease the duty cycle of the PWM voltage signal P1 produced by the PWM signal to cause the input voltage Vin to be increased when receiving the second trigger signal. Usually, the ratio between the output voltage Vout and the input voltage Vin is the duty cycle of the PWM voltage signal P1 and the output voltage Vout is usually maintained at a constant value, such as, 3.7 V, to power the function module 2. Therefore, when the duty cycle of the PWM voltage signal P1 is increased, the input voltage Vin is decreased accordingly, when the duty cycle of the PWM voltage signal P1 is decreased, the input voltage Vin is increased accordingly. Obviously, when the input voltage Vin is equal to the reference voltage Vref, the comparison unit 30 does not output any trigger signals, and the control unit 40 does not adjust the duty cycle of the PWM voltage signal P1 produced by the PWM signal producing unit 20.

In the embodiment, the reference voltage Vref is equal to a half of a voltage output by the heat utilizing circuit 1 when the heat utilizing circuit 1 is not connected to the function module 2. Usually, when the heat utilizing circuit 1 is connected to the function module 2 to power the function module 2, if the input voltage Vin is equal to the reference voltage Vref, an output power output to the function module 2 is greatest. Therefore, in the embodiment, the comparison unit 30 compares the input voltage Vin with the reference voltage Vref, and the control unit 40 adjusts the duty cycle of the PWM voltage signal P1 produced by the PWM signal producing unit 20 to adjust the input voltage Vin when the input voltage Vin is not equal to the reference voltage Vref.

In the embodiment, the heat utilizing circuit 1 also includes a middle voltage obtaining and output unit 50, which is connected to an output port 11 of the heat conversion unit 10 and the comparison unit 30. The middle voltage obtaining and output unit 50 is used to obtain a voltage output by the output port 11 of the heat conversion unit 10 when the heat utilizing circuit 1 is not connected to the function module 2. The middle voltage obtaining and output unit 50 then calculates a half of the voltage output by the output port 11 to obtain the reference voltage Vref, and then provides the reference voltage Vref to the comparison unit 30.

Figure 2:
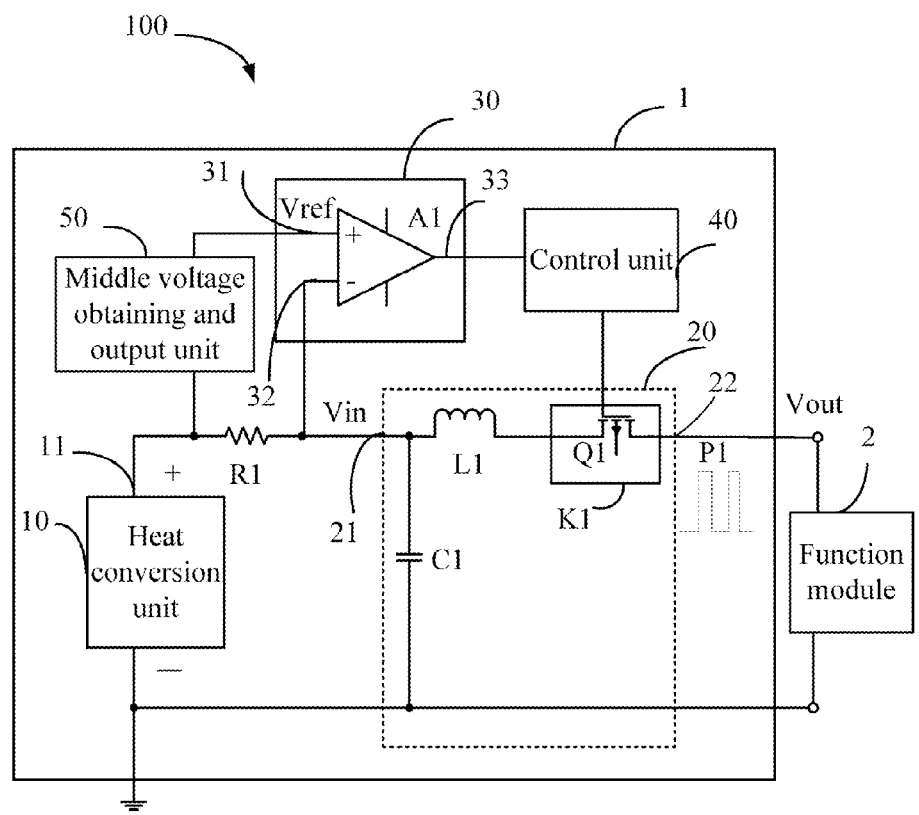
FIG. 2 is a circuit diagram of an embodiment of an electronic device with a heat utilizing circuit.

FIG. 2 shows a circuit diagram of the electronic device 100. In the embodiment, the PWM signal producing unit 20 includes a switch K1. The switch K1 is electrically connected between the output port 11 of the heat conversion unit 10 and the function module 2. The control unit 40 turns on or off the switch K1 alternately, thus the PWM signal producing unit 20 produces the PWM voltage signal P1 accordingly. The control unit 40 adjusts a duration when the switch K1 is turned on, the duty cycle of the PWM voltage signal P1 output by the PWM signal producing unit 20 is adjusted. As is known, when the duration of turning on the switch K is increased, the duty cycle of the PWM voltage signal P1 is increased, when the duration of turning off the switch K is decreased, the duty cycle of the PWM voltage signal P1 is decreased.

In the embodiment, the switch K is a metal oxide semiconductor field effect transistor (MOSFET) Q1. A gate of the MOSFET Q1 is connected to the control unit 40, a source of the MOSFET Q1 is electrically connected to the output port 11 of the heat conversion unit 10, and a drain of the MOSFET Q1 is electrically connected to the function module 2. In the embodiment, the control unit 40 outputs a high voltage and a low voltage alternately, and then controls the MOSFET Q1 to turn on or off alternately. The control unit 40 adjusts the duration of outputting the high voltage or the low voltage, and thus to adjust the duration of turning on or off the MOSFET Q1, thus adjusting the duty cycle of the PWM voltage signal P1 output by the PWM signal producing unit 20.

The PWM signal producing unit 20 also includes an inductor L1 and a capacitor C1, the inductor L1 is electrically connected between the output port 11 of the heat conversion unit 10 and the source of the MOSFET Q1. The capacitor C1 is connected between an end of the inductor L1 which is electrically connected to the output port 11 and ground. The inductor L1 and the capacitor C1 are combined to rectify the voltage output by the output port 11 of the heat conversion unit 10.

The comparison unit 30 includes a comparator A1, the comparator A1 includes a non-inverting input port 31, an inverting input port 32, and an output port 33. The non-inverting input port 31 receives the reference voltage Vref, the inverting input port 32 is connected to the first port 21 of the PWM signal producing unit 20, and the output port 33 is connected to the control unit 40 and outputs the first trigger signal or the second trigger signal to the control unit 40.

In the embodiment, the first trigger signal is a low voltage signal and the second trigger signal is a high voltage signal. The comparator A1 outputs the low voltage signal when the comparator A1 compares the input voltage Vin is greater than the reference voltage Vref, and outputs the high voltage signal when the comparator A1 compares the input voltage Vin is less than the reference voltage Vref. The control unit 40 controls to increase the duty cycle of the PWM voltage signal P1 when receiving the low voltage signal, thereby decreasing the input voltage Vin. The control unit 40 also controls to decrease the duty cycle of the PWM voltage signal P1 when receiving the high voltage signal, thereby increasing the input voltage Vin.

In the embodiment, the heat conversion unit 10 can be an alkali metal thermal to electric converter or a PN Junction thermocouple.

In the embodiment, the heat utilizing circuit 1 also includes a resistor R1 connected between the output port 11 of the heat conversion unit 10 and the first port 21 of the PWM signal producing unit 20.

In the embodiment, the heat conversion unit 10 is adhered on a component radiated a large of heat, such as a central processing unit. In another embodiment, the heat conversion unit 10 does not need to be adhered to any component. The function module 2 is also connected to a power source (not shown), thus the function module 2 can be powered by the power source when the heat utilizing circuit 1 does not output power, thus maintaining the work state of the function module 2.

The electronic device 200 can be a mobile phone, a tablet computer, a notebook computer, digital camera, or an electronic book, for example.

Figure 3:
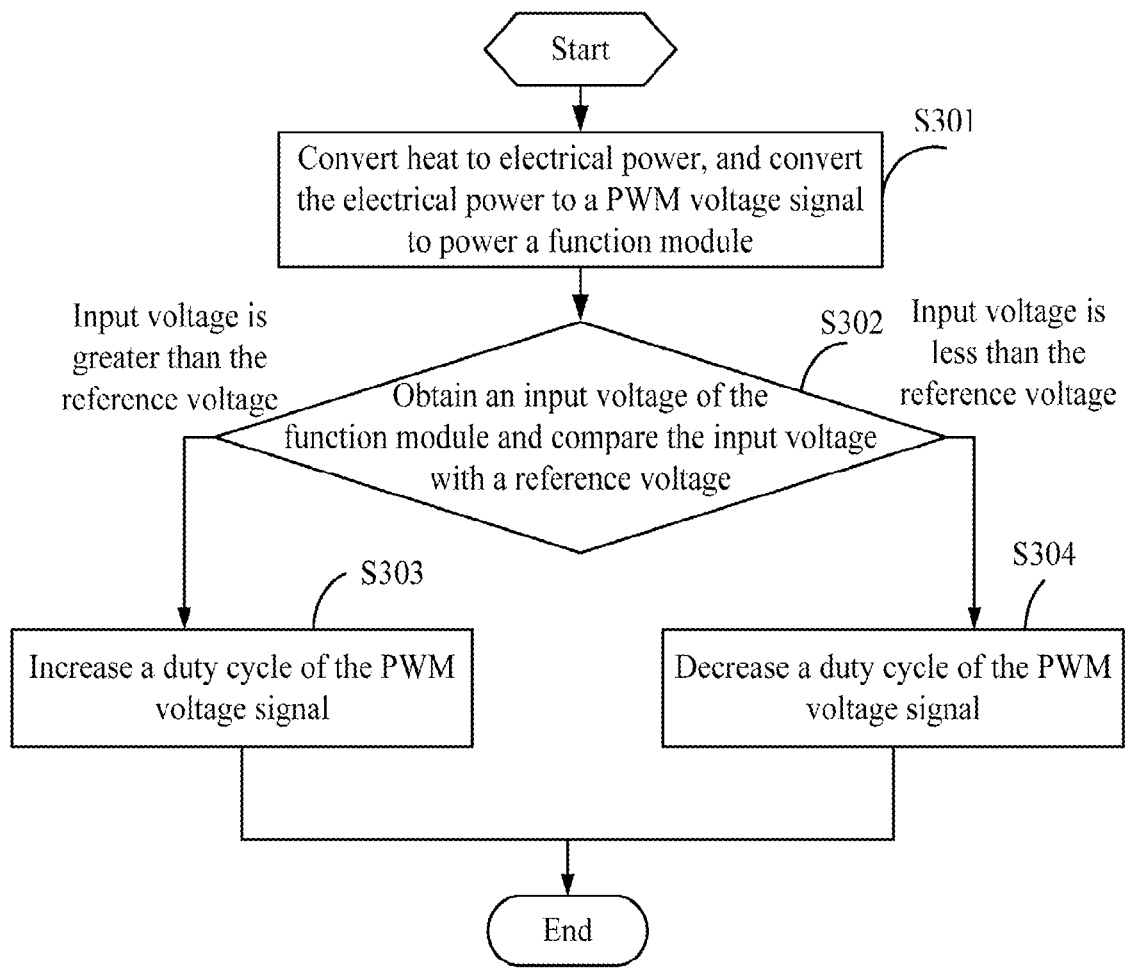
FIG. 3 is a flowchart illustrating a method of utilizing heat of an embodiment.

FIG. 3 illustrates a method for utilizing heat. At first, the heat conversion unit 10 converts the heat to electrical power, and then the PWM signal producing unit 20 converts the electrical power produced by the heat conversion unit 10 to a PWM voltage signal P1 and powers the function module 2 by using the PWM voltage signal (S301).

The comparison unit 30 obtains the input voltage Vin and compares the input voltage Vin with a reference voltage Vref (S302).

The comparison unit 30 produces a first trigger signal when comparing the input voltage Vin is grater than the reference voltage Vref, and the control unit 40 increases a duty cycle of the PWM voltage signal P1 produced by the PWM signal producing unit 20 when receiving the first trigger signal (S303).

The comparison unit 30 produces a second trigger signal when comparing the input voltage Vin is less than the reference voltage Vref, and the control unit 40 decreases the duty cycle of the PWM voltage signal P1 produced by the PWM signal producing unit 20 when receiving the second trigger signal (S304).

It is understood that the present embodiments and their advantages will be understood from the foregoing description, and various changes may be made thereto without departing from the spirit and scope of the disclosure or sacrificing all of its material advantages, the examples hereinbefore described merely being embodiments of the present disclosure.

What is claimed is:

1. A heat utilizing circuit, configured to convert heat radiated by an electronic device to electrical power to power a function module of the electronic device, the heat utilizing circuit comprising:
   a heat conversion unit, configured to convert the heat to electrical power;
   a pulse width modulation (PWM) signal producing unit comprising a first port and a second port, wherein, the first port is electrically connected to the heat conversion unit and the second port is to be electrically connected to the function module, the PWM signal producing unit is configured to convert the electrical power produced by the heat conversion unit to a PWM voltage signal and to power the function module by using the PWM voltage signal, wherein, a voltage of the first port is an input voltage of the function module;
   a comparison unit connected to the first port of the PWM signal producing unit, configured to obtain the input voltage and compare the input voltage with a reference voltage, and produce a first trigger signal when comparing the input voltage is grater than the reference voltage, and produce a second trigger signal when comparing the input voltage is less than the reference voltage; and
   a control unit connected between the comparison unit and the PWM signal producing unit, and configured to increase a duty cycle of the PWM voltage signal produced by the PWM signal producing unit when receiving the first trigger signal, and to decrease the duty cycle of the PWM voltage signal produced by the PWM signal when receiving the second trigger signal.

2. The heat utilizing circuit according to claim 1, further comprising a middle voltage obtaining and output unit connected to an output port of the heat conversion unit and the comparison unit, wherein, the middle voltage obtaining and output unit is configured to obtain a voltage output by the output port of the heat conversion unit when the heat utilizing circuit is not to be connected to the function module, and calculate a half of the voltage output by the output port to obtain the reference voltage, and then provide the reference voltage to the comparison unit.

3. The heat utilizing circuit according to claim 1, wherein the PWM signal producing unit comprises a switch electrically connected between the heat conversion unit and the function module, wherein, the control unit turns on or off the switch alternately, thus the PWM signal producing unit produces the PWM voltage signal accordingly, the control unit adjusts a duration of turning on the switch, the duty cycle of the PWM voltage signal output by the PWM signal producing unit is adjusted accordingly.

4. The heat utilizing circuit according to claim 3, wherein the switch is a metal oxide semiconductor field effect transistor (MOSFET), gate of the MOSFET is connected to the control unit, a source of the MOSFET is electrically connected to the heat conversion unit, and a drain of the MOSFET is to be electrically connected to the function module; the control unit outputs a high voltage and a low voltage alternately, and then controls the MOSFET to turn on or off alternately, the control unit adjusts the duration of outputting the high voltage or the low voltage, and thus to adjust the duration of turning on or off the MOSFET, thus adjusting the duty cycle of the PWM voltage signal output by the PWM signal producing unit.

5. The heat utilizing circuit according to claim 3, wherein the PWM signal producing unit further comprises an inductor and a capacitor, the inductor is electrically connected between the heat conversion unit and the switch, the capacitor is connected between ground and an end of the inductor which is electrically connected to the heat conversion unit.

6. The heat utilizing circuit according to claim 1, wherein the comparison unit comprises a comparator comprising a non-inverting input port, an inverting input port, and an output port, the non-inverting input port receives the reference voltage, the inverting input port is connected to the first port of the PWM signal producing unit, and the output port is connected to the control unit; wherein, the first trigger signal is a low voltage signal and the second trigger signal is a high voltage signal, the comparator outputs the low voltage signal to the control unit when comparing the input voltage is greater than the reference voltage, and outputs the high voltage signal to the control unit when comparing the input voltage is less than the reference voltage.

7. An electronic device comprising:
a function module; and
a heat utilizing circuit comprising:
a heat conversion unit, configured to convert the heat to electrical power;
a pulse width modulation (PWM) signal producing unit comprising a first port and a second port, wherein, the first port is electrically connected to the heat conversion unit and the second port is to be electrically connected to the function module, the PWM signal producing unit is configured to convert the electrical power produced by the heat conversion unit to a PWM voltage signal and to power the function module by using the PWM voltage signal, wherein, a voltage of the first port is an input voltage of the function module;
a comparison unit connected to the first port of the PWM signal producing unit, configured to obtain the input voltage and compare the input voltage with a reference voltage, and produce a first trigger signal when comparing the input voltage is grater than the reference voltage, and produce a second trigger signal when comparing the input voltage is less than the reference voltage; and
a control unit connected between the comparison unit and the PWM signal producing unit, and configured to increase a duty cycle of the PWM voltage signal produced by the PWM signal producing unit when receiving the first trigger signal, and to decrease the duty cycle of the PWM voltage signal produced by the PWM signal when receiving the second trigger signal.

8. The electronic device according to claim 7, further comprising a middle voltage obtaining and output unit connected to an output port of the heat conversion unit and the comparison unit, wherein, the middle voltage obtaining and output unit is configured to obtain a voltage output by the output port of the heat conversion unit when the heat utilizing circuit is not to be connected to the function module, and calculate a half of the voltage output by the output port to obtain the reference voltage, and then provide the reference voltage to the comparison unit.

9. The electronic device according to claim 7, wherein the PWM signal producing unit comprises a switch electrically connected between the heat conversion unit and the function module, wherein, the control unit turns on or off the switch alternately, thus the PWM signal producing unit produces the PWM voltage signal accordingly, the control unit adjusts a duration of turning on the switch, the duty cycle of the PWM voltage signal output by the PWM signal producing unit is adjusted accordingly.

10. The electronic device according to claim 9, wherein the switch is a metal oxide semiconductor field effect transistor (MOSFET), gate of the MOSFET is connected to the control unit, a source of the MOSFET is electrically connected to the heat conversion unit, and a drain of the MOSFET is to be electrically connected to the function module; the control unit outputs a high voltage and a low voltage alternately, and then controls the MOSFET to turn on or off alternately, the control unit adjusts the duration of outputting the high voltage or the low voltage, and thus to adjust the duration of turning on or off the MOSFET, thus adjusting the duty cycle of the PWM voltage signal output by the PWM signal producing unit.

11. The electronic device according to claim 9, wherein the PWM signal producing unit further comprises an inductor and a capacitor, the inductor is electrically connected between the heat conversion unit and the switch, the capacitor is connected between ground and an end of the inductor which is electrically connected to the heat conversion unit.

12. The electronic device according to claim 7, wherein the comparison unit comprises a comparator comprising a non-inverting input port, an inverting input port, and an output port, the non-inverting input port receives the reference voltage, the inverting input port is connected to the first port of the PWM signal producing unit, and the output port is connected to the control unit; wherein, the first trigger signal is a low voltage signal and the second trigger signal is a high voltage signal, the comparator outputs the low voltage signal to the control unit when comparing the input voltage is greater than the reference voltage, and outputs the high voltage signal to the control unit when comparing the input voltage is less than the reference voltage.

13. The electronic device according to claim 7, wherein the electronic device is one selected from a group consist of a mobile phone, a tablet computer, a notebook computer, and a digital photo frame.

14. A method for utilizing heat, comprising:
converting heat to electrical power, and converting the electrical power to a PWM voltage signal to power a function module;
obtaining an input voltage of the function module and comparing the input voltage with a reference voltage;
increasing a duty cycle of the PWM voltage signal when comparing the input voltage is grater than the reference voltage; and
decreasing a duty cycle of the PWM voltage signal when comparing the input voltage is less than the reference voltage.

* * * * *